United States Patent Office 3,660,527
Patented May 2, 1972

---

3,660,527
METHOD OF THE SOLUTION POLYMERIZATION OF ACRYLONITRILE
Hiroshi Sakai, Zenzi Izumi, and Hideji Kitagawa, Iyo-gun, Satosi Hamada, Matsuyama, and Masakuni Hoshina, Iyo-gun, Japan, assignors to Toray Industries, Inc., Tokyo, Japan
No Drawing. Filed June 15, 1970, Ser. No. 46,542
Int. Cl. C08f 3/76, 15/22
U.S. Cl. 260—85.5                                    9 Claims

ABSTRACT OF THE DISCLOSURE

A method wherein, in carrying out the solution polymerization of either acrylonitrile singly or a mixture consisting of at least 70 mol percent thereof and at least one polymerizable vinyl compound, in a polymerization solvent consisting predominantly of a dialkyl sulfoxide, using a polymerization initiator of the azo compound type, the polymerization is effected in the presence, as a discoloration inhibitor, of at least one compound of the group consisting of the inorganic acid salts and organic acid salts of beta-hydroxyethylhydrazine and beta-cyanoethylhydrazine. These discoloration inhibitors not only demonstrate a satisfactory discoloration preventive effect but also bring about an improvement in the polymerization speed and degree of polymerization of the resulting polymer.

---

This invention relates to a method for the solution polymerization of acrylonitrile (AN). More particularly, the invention relates to a method which is characterized in that in conducting the solution polymerization of either acrylonitrile singly or a mixture thereof with at least one other polymerizable vinyl compound wherein the AN content is at least 70 mol percent, the polymerization reaction is carried out in the presence of at least one compound selected from the group consisting of the inorganic and organic acid salts of beta-hydroxyethylhydrazine and beta-cyanoethylhydrazine, using as the polymerization solvent either a dialkyl sulfoxide (DASO) singly or a solvent predominantly of DASO and as the polymerization initiator an azo compound.

There are two processes for polymerizing the AN type polymer to be used in the preparation of the acrylic synthetic fibers, one being the aqueous polymerization process which uses water as the polymerization medium and the other being the solution polymerization process which uses a solvent for the AN type polymer as the polymerization medium. Of these two processes, the former requires the steps of filtration, washing, granulation, drying and dissolution of the polymer in preparing the spinning solution to be used in the manufacture of the acrylic fiber, whereas in the case of the latter the resulting polymer solution can be used as obtained as the spinning solution. Thus, the latter process is not only more advantageous but it also is preferable from the economical standpoint. When the polymerization is carried out in accordance with the foregoing solution polymerization process using as the polymerization solvent either a dialkyl sulfoxide alone or a solvent predominantly of dialkyl sulfoxide (these will be referred to hereinafter as DASO type solvents), the decline in the degree of polymerization of the AN type polymer is not only small but also the recovery of the solvent can be carried out with advantage.

A method of polymerizing acrylonitrile in a dialkyl sulfoxide type solvent using an azo compound as the polymerization initiator has been known heretofore. The control of the polymerization reaction is very easy in the case where an azo compound is used, since its decomposition depends upon heat alone and it is hardly effected at all by other impurities; on the other hand, owing to its slow rate of decomposition, it is necessary to carry out the polymerization reaction at elevated temperatures and prolonged periods of time. Accordingly, there is the drawback that there is increased discoloration of the polymer solution arising from the cyano group of acrylonitrile. To prevent the discoloration of the AN type polymer in carrying out its solution polymerization, one method suggested is that of adding various classes of inorganic or organic acids while another suggests using a stabilizer for polyacrylonitrile, such as a compound having either an amino, amido or hydroxyl group, for example, beta-hydroxy-t-amine, 1-dimethylamino-ethanol and N-(2-hydroxyethyl)-N-methyl.

However, the discoloration preventive effect is inadequate in the case of the former method and the whiteness of the fiber obtained is such that the AN type polymer obtained by this method is not desirable for use in the manufacture of acrylic fibers. On the other hand, in the case of the latter method, it was found that it was not fully effective in preventing discoloration when used for the solution polymerization of acrylonitrile in a DASO type solvent using an azo compound as the polymerization initiator. As a result of extensive research with a view to solving the foregoing shortcoming of the prior art, i.e., the problem of the discoloration of the polymer solution which arises when the solution polymerization of acrylonitrile is carried out using an azo compound as the initiator, the present invention was perfected.

Accordingly, an object of the present invention is to prevent the discoloration of the polymer solution in the solution polymerization of either acrylonitrile singly or a mixture thereof with at least one other polymerizable vinyl compound wherein the acrylonitrile content is at least 70 mol percent and thus provide an AN type polymer solution for use in the manufacture of acrylic synthetic fibers possessing very outstanding whiteness.

Another object is to provide a salt of hydrazine for use in obtaining either polyacrylonitrile or an AN type copolymer by the solution polymerization using as the polymerization solvent DASO or a solvent which is predominantly DASO and as the polymerization initiator an azo compound.

The polymerizable vinyl compounds which can be copolymerized with acrylonitrile, include, for example, acrylic and methacrylic acid and the esters thereof, acrylamide, methacrylamide and the monoalkyl substitution products thereof; vinyl carboxylates such as styrene, vinyl chloride, vinylidene chloride and vinyl acetate; vinyl pyridines and their alkyl-substituted products; alkenyl aromatic sulfonic acid, vinyl sulfonic acid and their salts; and allyl sulfonic acid, methallylsulfonic acid and their salts. However, the polymerizable compounds are not limited to those mentioned.

The solvent predominantly of DASO is a solvent mixture of DASO and not more than 10% of a solvent compatible therewith, such as water, alcohols, ketones, dimethylformamide and dimethylacetamide. DASO includes dimethyl sulfoxide and diethyl sulfoxide, of which dimethyl sulfoxide is most preferably used.

As the azo compounds, the polymerization initiator, included are those which are known as being polymerization initiators of acrylonitrile, such as azobisisobutyronitrile and azobisdimethylvaleronitrile.

Of particular importance in the present invention is that in carrying out the polymerization of either AN or a mixture of at least 70 mol percent AN with other polymerizable compounds using the aforesaid DASO type solvent and azo compound, respectively, as the polymerization solvent and initiator, the polymerization reaction is conducted with the addition of at least one compound selected from the group consisting of the inorganic and organic acid salts of beta-hydroxyethylhydrazine and beta-cyanoethylhydrazine as the discoloration inhibitor.

As the inorganic acid salts of beta-hydroxyethylhydrazine and beta-cyanoethylhydrazine, mention can be made of the salts of sulfuric, phosphoric, nitric, carbonic and sulfamic acids. Any of these mono- and di-inorganic acid salts are usable. On the other hand, included among the organic acid salts of beta-hydroxyethylhydrazine and beta-cyanoethylhydrazine are monooxalates, dioxalates, monomaleates, dimaleates, monotartrates, ditartrates, monoacetates and diacetates. The solubility of all of these salts in the liquid polymerization mixture is exceedingly great and the polymerization operation is carried out with ease. Moreover, these compounds not only demonstrate of satisfactory discoloration preventive effect but also have good effects on the polymerization speed.

The hydrohalogenic acid salts of beta-hydroxyethylhydrazine or beta-cyanoethylhydrazine are not preferable in this invention. For example, the hydrochloric acid salts free hydrochloric acid in the polymerization system to cause corrosion of stainless steel, of which the equipment is constructed, with the consequence that iron ions are eluted aggravation of the degree of discoloration of the polymer solution as well as other polymerization properties. Also, chlorine ions are contained in the resulting polymer to become the cause of deterioration of the light fastness of the polymer. Further, free beta-hydroxyethylhydrazine or free beta-cyanoethylhydrazine cannot be used for achieving the objects of the present invention. The reason: free beta-hydroxyethylhydrazine and free beta-cyanoethylhydrazine are alkaline in character and therefore react with the alkaline side of acrylonitrile to form reaction products which have a deteriorating effect on the degree of polymerization and the polymerization speed.

When the inorganic acid salts or organic acid salts of beta-hydroxyethylhydrazine are compared with the inorganic or organic acid salts of beta-cyanoethylhydrazine, the former are preferred in that their effects on the polymerization properties such as polymerization speed and degree of polymerization are less than that of the latter.

In addition, it was found that the still better effects are achieved when the salts are used in combination of two or more classes than when they are used singly. This is believed to be due to the synergistic effect of the different classes of salts used.

Further, these compounds are especially effective when they are used in combination with a neutral salt of the aforesaid acids or various inorganic or organic acids, such, for example, as ammonium oxalate, ammonium phosphate and ammonium sulfamate.

The desired results are obtained by the addition of the inorganic or organic acid salts of beta-hydroxyethylhydrazine or beta-cyanoethylhydrazine in a small quantity. Normally, an amount ranging between 0.005% by weight and 0.10% by weight, based on the liquid polymerization mixture, is preferred.

The polymerization reaction, as is customary, is carried out on the acid side. For adjusting the pH of the polymerization system, the various inorganic and organic acids such as sulfuric acid, phosphoric acid, oxalic acid, sulfamic acid and methanesulfonic acid can be used.

The polymerization reaction is carried out in the presence of an inert gas such as nitrogen or carbon dioxide and in the absence of oxygen which clearly hinders the reaction. Again, it goes without saying that the polymerization reaction can be carried out either continuously or batchwise. After completion of the polymerization, the reaction solution can be directly delivered to the spinning step after it has been defoamed.

According to the invention, an AN type polymer solution is obtained with no decline in its degree of polymerization and whose degree of coloration is exceedingly small, i.e., of a degree as has not been seen heretofore in the process wherein acrylonitrile is solution polymerized in a DASO type solvent. Also the acrylic fiber manufactured from this spinning solution possesses superior whiteness as well as other excellent fiber properties.

The following examples are given for illustrating the invention more specifically. In the examples the degree of polymerization and the degree of discoloration of the polymer solution are values obtained as follows:

Degree of polymerization: Comparison was made of the intrinsic viscosity $[\eta]$ obtained by substitution in the following formula the specific viscosity $\eta$ sp, which was obtained by measurement at 25° C. on a solution of the polymer in a 0.1 N sodium thiocyanate-dimethylformamide solvent mixture at a concentration of 3 grams per liter.

$$[\eta] = \frac{\sqrt{1 + 1.32\ \eta\mathrm{sp}} - 1}{0.198}$$

Degree of discoloration of polymer solution: The polymer solution was placed in a quartz cell of 1-cm. wall-to-wall dimension and with a light having a wavelength of 400 m$\mu$, the transmittance (percent) of the solution was measured with an ultraviolet-visible spectrophotometer. The measurements were then compared.

Unless otherwise specified, the parts used in the examples are on a weight basis.

EXAMPLE I

Twenty parts of acrylonitrile, 2 parts of methyl acrylate, 0.2 part of sodium methallylsulfonate, 0.05 part of dodecyl mercaptan and 0.01 part of sulfuric acid were dissolved in 78 parts of dimethyl sulfoxide (DMSO). After adding 0.1 part of 2,2'-azobis (2,4-dimethylvalero nitrile) as the polymerization initiator, the polymerization reaction was carried out for 10 hours at 50° C. and thereafter for a further 10 hours after raising the temperature to 55° C. In carrying out the polymerization reaction in this manner, various inorganic and organic acid salts of either beta-hydroxyethylhydrazine or beta-cyanoethylhydrazine were added in an amount of 0.02 part in each instance. The rate of polymerization, degree of polymerization and the degree of discoloration of the polymer solutions obtained after 20 hours of operation are shown in Table 1.

TABLE 1

| Salt of hydrazine | Rate of polymerization, percent | $[\eta]$ | 400 m$\mu$ transmittance, percent |
|---|---|---|---|
| Not added | 88.5 | 1.39 | 51.5 |
| beta-Hydroxyethylhydrazine monosulfate | 93.8 | 1.36 | 76.2 |
| beta-Hydroxyethylhydrazine disulfate | 92.5 | 1.37 | 75.8 |
| beta-Cyanoethylhydrazine monosulfate | 90.8 | 1.35 | 74.2 |
| beta-Cyanoethylhydrazine disulfate | 89.6 | 1.29 | 76.0 |
| beta-Hydroxyethylhydrazine monooxalate | 93.1 | 1.35 | 77.3 |
| beta-Hydroxyethylhydrazine dioxalate | 93.3 | 1.36 | 76.5 |
| beta-Cyanoethylhydrazine monooxalate | 90.0 | 1.30 | 76.6 |
| beta-Cyanoethylhydrazine dioxalate | 89.9 | 1.27 | 77.0 |
| beta-Hydroxyethylhydrazine monophosphate | 94.0 | 1.34 | 75.9 |
| beta-Cyanoethylhydrazine monophosphate | 91.2 | 1.27 | 73.8 |
| beta-Hydroxyethylhydrazine monosulfamate | 94.1 | 1.38 | 75.3 |
| beta-Cyanoethylhydrazine monosulfamate | 90.0 | 1.29 | 76.2 |
| beta-Hydroxyethylhydrazine monomaleate | 93.2 | 1.35 | 68.3 |
| beta-Cyanoethylhydrazine monomaleate | 88.9 | 1.28 | 70.2 |
| beta-Hydroxyethylhydrazine monotartrate | 92.6 | 1.36 | 70.1 |
| beta-Cyanoethylhydrazine ditartrate | 93.4 | 1.35 | 68.9 |
| beta-Cyanoethylhydrazine monotartrate | 90.3 | 1.28 | 69.5 |
| beta-Cyanoethylhydrazine ditartrate | 89.5 | 1.29 | 72.3 |
| beta-Hydroxyethylhydrazine mononitrate | 93.0 | 1.37 | 74.6 |
| beta-Hydroxyethylhydrazine dicarbonate | 93.7 | 1.34 | 76.3 |
| beta-Cyanoethylhydrazine mononitrate | 88.5 | 1.25 | 75.0 |
| beta-Cyanoethylhydrazine dicarbonate | 89.0 | 1.26 | 75.2 |
| beta-Hydroxyethylhydrazine monoacetate | 93.0 | 1.36 | 69.0 |
| beta-Cyanoethylhydrazine monoacetate | 89.3 | 1.35 | 68.3 |

As is apparent from the foregoing results, the inorganic or organic acid salts of either beta-hydroxyethylhydrazine or beta-cyanoethylhydrazine possess an excellent discoloration preventive effect. When the inorganic and organic acid salts of beta-hydroxyethylhydrazine and those of beta-cyanoethylhydrazine are compared, the former is superior to the latter with respect to the point that the effects had on such polymerization properties as polymerization speed and degree of polymerization are less. Hardly any difference in effects is noted between the inorganic and organic acid salts.

EXAMPLE II

An experiment was carried out under identical conditions as in Example I, except that the amounts of beta-hydroxyethylhydrazine monosulfate and beta-cyanoethylhydrazine monosulfate were varied. The rate of polymerization, degree of polymerization and degree of discoloration of polymer solution after 20 hours of operation are shown in Tables 2 and 3.

TABLE 2

| Amount added of beta-hydroxyethylhydrazine monosulfate (part) | Rate of polymerization, percent | [η] | Transmittance of polymer solution, percent |
|---|---|---|---|
| 0 | 88.5 | 1.38 | 50.3 |
| 0 | 88.5 | 1.38 | 50.3 |
| 0.002 | 92.3 | 1.37 | 58.1 |
| 0.005 | 94.3 | 1.35 | 64.8 |
| 0.010 | 93.2 | 1.35 | 72.3 |
| 0.050 | 91.5 | 1.31 | 74.5 |
| 0.100 | 90.2 | 1.39 | 77.9 |
| 0.200 | 87.3 | 1.25 | 81.0 |

TABLE 3

| Amount added of beta-cyanoethylhydrazine monosulfate (part) | Rate of polymerization, (percent) | (η) | Transmittance of polymer solution, percent |
|---|---|---|---|
| 0 | 88.5 | 1.38 | 50.3 |
| 0.002 | 91.6 | 1.36 | 56.8 |
| 0.005 | 92.1 | 1.34 | 65.0 |
| 0.010 | 90.8 | 1.29 | 71.5 |
| 0.050 | 89.6 | 1.25 | 73.8 |
| 0.100 | 88.5 | 1.20 | 76.0 |
| 0.200 | 83.8 | 1.15 | 80.0 |

While a greater discoloration preventive effect is had as the amount of beta-hydroxyethylhydrazine monosulfate or beta-cyanoethylhydrazine monosulfate is increased, a tendency toward a decline in the rate of polymerization and degree of polymerization takes place. This tendency is especially great in the case of beta-cyanoethylhydrazine monosulfate. Thus, in consideration of the discloroation preventive effect, the rate of polymerization and degree of polymerization, the amount of the inorganic or organic acid salts of beta-hydroxyethylhydrazine or beta-cyanoethylhydrazine is preferably in the range of 0.005–0.10% by weight based on the liquid polymerization mixture.

EXAMPLE III

The effects of the conjoint use of neutral inorganic and organic acid salts were investigated by operating under identical conditions as in Example I. 0.02 part of an inorganic or organic acid salt of beta-hydroxyethylhydrazine or beta-cyanoethylhydrazine was or was not used with 0.02 part of a neutral salt of an inorganic or organic salt. The rate of polymerization, degree of polymerization and degree of discoloration after 20 hours of operation are shown in Table 4.

TABLE 4

| Salt of hydrazine | Rate of polymerization, percent | [η] | Transmittance of polymer solution, percent |
|---|---|---|---|
| beta-Hydroxyethylhydrazine monooxalate | 93.3 | 1.35 | 77.3 |
| Conjoint use of ammonium oxalate with above | 93.2 | 1.38 | 80.0 |
| beta-Hydroxyethylhydrazine sulfamate | 93.5 | 1.34 | 75.0 |
| Conjoint use of ammonium sulfamate with above | 94.0 | 1.36 | 79.0 |
| beta-Cyanoethylhydrazine monooxalate | 90.0 | 1.30 | 76.6 |
| Conjoint use of ammonium oxalate with above | 91.5 | 1.33 | 79.9 |
| beta-Cyanoethylhydrazine sulfamate | 89.8 | 1.27 | 75.3 |
| Conjoint use of ammonium sulfamate with above | 90.3 | 1.31 | 80.5 |

It can be seen that a still better discoloration preventive effect is had when an inorganic or organic neutral salt is conjointly used with the inorganic or organic acid salt of beta-hydroxyethylhydrazine or beta-cyanoethylhydrazine. The heason therefor is not clear.

EXAMPLE IV

To 20 parts of acrylonitrile, 3 parts of methyl acrylate, 0.2 part of sodium methallylsulfonate, 0.4 part of dodecyl mercaptan, 0.01 part of sulfuric acid, 2 parts of water, 75 parts of dimethyl sulfoxide, 0.03 part of 2,2'-azobisisobutyronitrile, 0.01 part of beta-cyanoethylhydrazine monosulfate and 0.02 part of ammonium sulfamate were added to obtain a liquid polymerization mixture, which was charged to a batch type 100-liter polymerization kettle and polymerized for 35 hours at 50° C. while continuing the purge with nitrogen. After 35 hours of operation the properties of the polymer solution were: viscosity 205 poises at 45° C., rate of polymerization 93.2%, transmittance of the solution 77.6%; and accordingly were satisfactory. This polymer solution, after filtration and defoaming, was spun through a spinneret having 9000 holes of 0.08 mm. diameter at 35° C. into aqueous 35% dimethyl sulfoxide solution, followed by the usual drawing, water-washing, relaxing and drying operation to obtain fibers having lustrous appearance. There were no abnormal fibers, such as devitrified fibers, and the whiteness of the fiber was excellent, the 400 mμ light reflectance being 72.5%. The physical properties of the fiber was also satisfactory, its tenacity being 3.1 g./d., elongation being 36% and knot strength being 2.5 g./d.

EXAMPLE V

Twenty parts of acrylonitrile, 2 parts of methyl acrylate, 0.2 part of sodium methallylsulfonic acid, 0.05 part of dodecyl mercaptan, 0.01 part of sulfuric acid and 0.01 part of ethylendiamine tetraacetic acid were dissolved in 78 parts of dimethyl sulfoxide and, after addition thereto of 0.1 part of 2,2-azobis(2,4-dimethylvaleronitrile) as the polymerization initiator, and various inorganic and organic salts of either beta-hydroxyethylhydrazine or beta-cyanoethylhydrazine, as shown in Table 5, the mixture was polymerized for a total of 20 hours—5 hours 48° C., 5 hours at 53° C. and 10 hours 58° C. The rates of polymerization at the times the temperature was raised were about 40% and 70%, respectively. The rate of polymerization, degree of polymerization and degree of discoloration of the polymer solution after 20 hours of operation when the various salts of beta-hydroxyethylhydrazine and beta-cyanoethylhydrazine were used in combination are shown in Table 5.

TABLE 5

| | Rate of polymerization, percent | [η] | Transmittance of polymer solution, percent |
|---|---|---|---|
| beta-Hydroxyethylhydrazine salts (parts): | | | |
| Monosulfate (0.01), monooxalate (0.01) | 92.3 | 1.40 | 80.5 |
| Monosulfate (0.01), monosulfamate (0.01) | 94.6 | 1.23 | 81.3 |
| Monophosphate (0.01), monosulfate (0.01) | 92.0 | 1.38 | 78.6 |
| Mononitrate (0.01), disulfamate (0.01) | 95.1 | 1.25 | 75.8 |
| Monosulfate (0.01), disulfamate (0.01) | 94.9 | 1.21 | 82.3 |
| Monosulfate (0.01), monotartrate (0.01) | 92.3 | 1.35 | 76.8 |
| Monosulfate (0.01), monomaleate (0.01) | 91.9 | 1.39 | 77.0 |
| Monophosphate (0.01), monosulfamate (0.01) | 94.8 | 1.22 | 78.8 |
| beta-Cyanoethylhydrazine salts (parts): | | | |
| Monosulfate (0.01), monosulfamate (0.01) | 93.5 | 1.21 | 80.0 |
| Monophosphate (0.01), monosulfamate (0.01) | 91.5 | 1.35 | 79.0 |
| Monosulfate (0.01), disulfamate (0.01) | 94.0 | 1.20 | 82.0 |
| Monosulfate (0.01), monotartrate (0.01) | 91.8 | 1.31 | 75.8 |

It is seen that an excellent discoloration preventive effect is had by using the various salts of beta-hydroxyethylhydrazine and beta-cyanoethylhydrazine in combination. Further, it was noted that a polymerization accelerating effect was demonstrated when a sulfamate was used as one of the components in this case. Of the various salts, it was confirmed that the ratio of polymerization was high and the discoloration preventive effect was very great in the case especially where a sulfate and a sulfamate were used in combination.

Comparative Example I

A comparative study was made of the effect of the conventional discoloration inhibitors and that of compounds of this invention in conducting the solution polymerization of acrylonitrile.

Twenty parts of acrylonitrile, 0.2 part of sodium allylsulfonate, 0.05 part of dodecyl mercaptan and 0.01 part of sulfuric acid were dissolved in a solvent mixture of 1 part of methanol and 79 parts of dimethyl sulfoxide. After adding 0.3 part of 2,2'-azobisisobutyronitrile to the foregoing mixture, the polymerization reaction was carried out for 35 hours at 50° C., using 0.02 part of various compounds as the discoloration inhibitor. The rate of polymerization, degree of polymerization and degree of discoloration of the polymer solutions after 35 hours of operation are shown in Table 6.

TABLE 6

| | Rate of polymerization, percent | [η] | Transmittance of polymer solution, percent |
|---|---|---|---|
| Not added | 94.3 | 1.68 | 46.8 |
| 1-dimethyl-aminoethanol | 94.8 | 1.62 | 44.2 |
| beta-Hydroxy-t-amine | 86.2 | 1.13 | 73.6 |
| N-(2-hydroxyethyl)-N-methylformamide | 94.5 | 1.71 | 48.9 |
| beta-Hydroxyethylhydrazine monosulfate | 93.8 | 1.61 | 73.8 |
| beta-Hydroxyethylhydrazine dioxalate | 92.6 | 1.63 | 74.5 |
| beta-Cyanoethylhydrazine monosulfate | 90.5 | 1.57 | 72.9 |
| beta-Cyanoethylhydrazine dioxalate | 90.9 | 1.54 | 75.5 |

As is apparent from the foregoing table, the compounds having either an amino, amide or hydroxyl group, i.e., compounds such as 1 - dimethylaminoethanol, beta-hydroxy-t-amine and N - (2-hydroxyethyl)-N-methyl-formamide, which have been used hiterto as stabilizers in the solution polymerization of acrylonitrile, simply cannot be used as a discoloration inhibitor in the solution polymerization of acrylonitrile, which uses as the solvent either dimethyl sulfoxide singly or a solvent predominantly of dimethyl sulfoxide. Of these compounds, only beta-hydroxy-t-amine has a considerable discoloration preventive effect but owing to its effect of causing a great drop in the rate of polymerization and degree of polymerization, it cannot be used. In contrast, the effects of the invention inorganic and organic acid salts of beta-hydroxyethylhydrazine and beta-cyanoethylhydrazine on the degree of polymerization of the AN type polymers are relatively small while their discoloration preventive effect is outstanding.

Comparative Example II

Hydrazine monochloride is known as being a discoloration inhibitor for the aqueous polymerization process of acrylonitrile, which uses as the polymerization medium aqueous zinc chloride solution and as the catalyst a persulfate. In this example comparisons were made of the use of the various hydrazine salts and the corresponding beta-hydroxyethylhydrazine salts of the present invention, respectively, in carrying out the solution polymerization of acrylonitrile using as the solvent dimethyl sulfoxide and as the catalyst an azo compound.

Twenty parts of acrylonitrile, 2 parts of methyl acrylate, 0.2 part of sodium methallylsulfonate, 0.05 part of dodecyl mercaptan and 0.01 part of sulfuric acid were dissolved in 78 parts of dimethyl sulfoxide followed by the addition of 0.1 part of 2,2'-abozis (2,4-dimethylvaleronitrile) as the polymerization initiator. The polymerization reaction was then carried out for a total of 20 hours— 5 hours at 48° C., 5 hours at 53° C. and 10 hours at 58° C. The rates of polymerization at the times the temperature was raised were about 40% and 70%, respectively. The rate of polymerization, degree of polymerization and degree of discoloration of the polymer solution after 20 hours of operation when the various salts of hydrazine and beta-hydroxyethylhydrazine were used as the discoloration inhibitor in carrying out the polymerization reaction are shown in Table 7.

TABLE 7

| Salt of hydrazine or beta-hydroxyethylhydrazine | Rate of polymerization, percent | [η] | Transmittance of polymer solution, percent |
|---|---|---|---|
| Hydrazine monosulfate | 92.6 | 1.35 | 75.9 |
| beta-Hydroxyethylhydrazine monosulfate | 93.0 | 1.29 | 81.5 |
| Hydrazine monooxalate | 91.8 | 1.42 | 73.8 |
| beta-Hydroxyethylhydrazine monooxalate | 91.6 | 1.39 | 76.3 |
| Hydrazine monosulfamate | 93.3 | 1.31 | 75.0 |
| beta-Hydroxyethylhydrazine monosulfamate | 93.9 | 1.35 | 79.5 |
| Hydrazine monotartrate | 91.5 | 1.31 | 70.1 |
| beta-Hydroxyethylhydrazine monotartrate | 92.8 | 1.38 | 72.3 |
| Hydrazine monophosphate | 92.0 | 1.39 | 72.0 |
| beta-Hydroxyethylhydrazine monophosphate | 92.5 | 1.39 | 77.0 |

When the corresponding salts of hydrazine and beta-hydroxyethylhydrazine were compared for their discoloration preventive effects, the salts of the latter were superior to the former in all cases. Further, the salts of beta-hydroxyethylhydrazine are also preferred from the standpoint of the prevention of explosion, fire and other hazards. In addition, a comparison of the solubility of the salts in dimethyl sulfoxide demonstrates that the salts of beta-hydroxyethyl hydrazine are superior in this respect also, thus indicating that they are very effective for use in commercial operations.

We claim:

1. In a process for solution polymerization of acrylonitrile alone or a mixture consisting of at least 70 mol percent of acrylonitrile and at least one polymerizable vinyl compound, in a polymerization solvent consisting essentially of a dialkyl sulfoxide, using a polymerization initiator of the azo compound type, the improvement which comprises carrying out the polymerization reaction in the presence of at least one compound selected from the group consisting of the inorganic acid salts and organic acid salts of beta-hydroxyethylhydrazine and beta-cyanoethylhydrazine in an amount of from 0.005% to 0.1% by weight based on the weight of the liquid polymerization mixture.

2. The method of claim 1 wherein said inorganic acid salt is a compound selected from the group consisting of sulfamates, sulfates, phosphates, nitrates and carbonates.

3. The method of claim 1 wherein said organic acid salt is a compound selected from the group consisting of oxalates, maleates, tartrates and acetates.

4. The method of claim 1 wherein said at least one compound consists of at least two beta-hydroethylhydrazine salts.

5. The method of claim 1 wherein said at least one compound consists of at least two beta-cyanoethylhydrazine salts.

6. The method of claim 1 wherein said dialkyl sulfoxide is dimethyl sulfoxide.

7. The method of claim 1 wherein said azo compound is 2,2'-azobis(2,4-dimethylvaleronitrile).

8. The method of claim 1 wherein said inorganic acid salt is a sulfate.

9. The method of claim 1 wherein said inorganic acid salt is a sulfamate.

References Cited

UNITED STATES PATENTS

| 2,580,919 | 1/1952 | Howard | 260—88.7 D |
| 2,606,893 | 8/1952 | Reynolds et al. | 260—88.7 F |
| 3,194,797 | 7/1965 | Caldwell et al. | 260—85.5 R |
| 3,373,147 | 3/1968 | Izumi et al. | 260—88.7 D |

HARRY WONG, JR., Primary Examiner

U.S. Cl. X.R.

260—29.6, 30.8, 32.6, 32.8, 33.4, 45.9, 45.95, 79.3, 88.7